United States Patent
Helt et al.

(10) Patent No.: US 11,176,166 B2
(45) Date of Patent: Nov. 16, 2021

(54) ABILITY TO MOVE APPLICATION SPACES BETWEEN TWO SEPARATE INDEPENDENT HIGH AVAILABILITY (HA) ENVIRONMENTS

(71) Applicant: International Business Machines Corporation, Armonk, NY (US)

(72) Inventors: Scott D. Helt, Rochester, MN (US); Kiswanto Thayib, Rochester, MN (US); Kristopher C. Whitney, Rochester, MN (US); Robert Miller, Rochester, MN (US); Jennifer A. Dervin, Rochester, MN (US); David Jones, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 16/449,208

(22) Filed: Jun. 21, 2019

(65) Prior Publication Data
US 2020/0401602 A1    Dec. 24, 2020

(51) Int. Cl.
*G06F 16/27* (2019.01)
*G06F 11/14* (2006.01)

(52) U.S. Cl.
CPC .......... *G06F 16/27* (2019.01); *G06F 11/1464* (2013.01); *G06F 2201/84* (2013.01)

(58) Field of Classification Search
CPC ............. G06F 11/2082; G06F 11/1464; G06F 11/2056; G06F 16/27; G06F 2201/84
See application file for complete search history.

(56) References Cited

U.S. PATENT DOCUMENTS

| | | | | |
|---|---|---|---|---|
| 2005/0268054 | A1* | 12/2005 | Werner | G06F 11/2069 711/162 |
| 2009/0259817 | A1* | 10/2009 | Sharma | G06F 11/2069 711/162 |
| 2013/0238690 | A1* | 9/2013 | Kashyap | H04L 67/10 709/203 |
| 2016/0266991 | A1 | 9/2016 | Cho et al. | |
| 2017/0228184 | A1* | 8/2017 | Kuznetsov | H04L 67/1097 |
| 2019/0138402 | A1 | 5/2019 | Bikumala et al. | |

OTHER PUBLICATIONS

VMWare White Paper,"Stretched Clusters and VMware vCenterSite Recovery Manager," 2009, 18 pages.

* cited by examiner

*Primary Examiner* — Etienne P Leroux
(74) *Attorney, Agent, or Firm* — Patterson + Sheridan, LLP

(57) ABSTRACT

In embodiments, the ability to have two separate Db2 Mirror pair environments, each providing HA, which have the capability to switch application spaces between the Db2 Mirror pairs, is presented. At least one IASP is registered to a first node of a first pair of nodes at a first HA mirroring environment at a first location. The at least one IASP is replicated to a second HA mirroring environment, the second HA mirroring environment including a second pair of nodes at a second location, the second location different than the first location. The at least one IASP is registered with one node of the pair of nodes of the second mirroring environment, the at least one IASP is switched offline at the first pair of nodes of the first mirroring environment, and subsequently switched online at the second pair of nodes of the second mirroring environment.

16 Claims, 6 Drawing Sheets

400

410 — Replicate an IASP stored on each of a pair of nodes of a first active Db2 mirroring environment at a first location to a pair of nodes in a second Db2 mirroring environment at a second location, the second location remote from the first, the IASP in either a coherent state or a non-coherent state between the nodes of the first Db2 mirroring environment

420 — Register the IASP with the second Db2 mirroring environment

430 — Switch the IASP offline at the first Db2 mirroring environment

440 — Switch the IASP online at the second Db2 mirroring environment, preserving the same coherent or non-coherent sate of the IASP between nodes of the second Db2 mirroring environment that the IASP had between the nodes of the first Db2 mirroring environment

```
┌─────────────────────────────────────┐
│ Replicate an IASP stored on a first │
│ active Db2 mirroring environment at │
│ a first location to a second Db2    │
│ mirroring environment at a second   │
│ location, the second location remote│ ─── 510
│ from the first, the IASP in an      │
│ active-active state on the two nodes│
│ of the first Db2 mirroring          │
│ environment                         │
└─────────────────────────────────────┘
                  ↓
┌─────────────────────────────────────┐
│ Register the IASP with the second   │ ─── 520
│ Db2 mirroring environment           │
└─────────────────────────────────────┘
                  ↓
┌─────────────────────────────────────┐
│ Vary off the IASP from the two nodes│
│ of the first Db2 mirroring          │ ─── 530
│ environment in tandem, in a dual    │
│ vary off operation                  │
└─────────────────────────────────────┘
                  ↓
┌─────────────────────────────────────┐
│ Vary the IASP online in tandem at   │
│ the two nodes of the second Db2     │
│ mirroring environment, using a dual │ ─── 540
│ vary on operation, preserving the   │
│ active-active state of the IASP     │
│ between the two nodes of the second │
│ Db2 mirroring environment           │
└─────────────────────────────────────┘
```

FIG. 5

ABILITY TO MOVE APPLICATION SPACES BETWEEN TWO SEPARATE INDEPENDENT HIGH AVAILABILITY (HA) ENVIRONMENTS

BACKGROUND

The present invention relates to mirroring environments, and more specifically, to facilitating the ability of an application space stored in a database of a first HA mirroring environment to be moved to a second separate and independent HA mirroring environment.

Many businesses, for example online retailers, rely on full time availability of their websites or other hosted applications. A business may easily lose a competitive edge following even one incident where its website has gone down for any significant amount of time. Accordingly, such businesses utilize HA environments as a failsafe, where each application, datum and object is replicated, essentially immediately.

However, such HA environments tend to have both system nodes relatively close to each other, such as, for example, in a data center. This arrangement, while convenient for the provider of the HA environment, makes the HA environment susceptible to both man-made as well as natural disasters, such as, for example, floods, power outages, terrorist activity, war, earthquake, biological infection or the like. It is for this reason that the redundancy of a HA environment needs to have its own backup plan. Ideally, a server operating within an HA environment at a first site would, in the event of a disaster, or needed maintenance that cannot be deferred, be able to switch to a backup server, with a minimum amount of downtime, and a seamless transition.

Moreover, an application space may be consolidated within one or more independent auxiliary storage pools (IASPs). If this is done, an entire application space may be moved if the IASP is moved. However, if the one or more IASPs are initially stored in an HA mirroring environment, and it is desired to move the one or more IASPs to another HA mirroring environment, at a new site, currently available solutions require the entire contents of the IASP to be moved to one system node of the new HA site, and then to be fully replicated over to the other system node of the new HA site from scratch. Thus, if it is desired to have two copies of the one or more IASPs stored at the new site in an new HA mirroring environment, it is required to first copy the one or more IASPs to a first system node of the new HA mirroring site, and then to fully replicate the same one or more IASPs, from scratch, from a first system node of the new HA site to a second system node of the new HA site in order to get the HA environment back in sync. This wastes time and adds to the burden of tasks that are required to successfully relocate an IASP pair, many IASPs pairs, or even an entire system, from an original HA mirroring environment at one site to a new HA mirroring environment at a second site.

It is thus desired to find a solution to facilitate easily moving an HA mirroring environment at a first location to a separate HA mirroring environment at a second location, without prolonged interruption.

SUMMARY

According to one embodiment of the present invention, a method is provided. The method includes registering at least one independent auxiliary storage pool (IASP) to a first node of a first pair of nodes at a first HA mirroring environment at a first location, and replicating the at least one IASP to a second HA mirroring environment, the second HA mirroring environment including a second pair of nodes at a second location. In some embodiments, the second location may be remote from the first location. The method further includes registering the at least one IASP with one node of the pair of nodes of the second mirroring environment, switching the at least one IASP offline at the first pair of nodes of the first mirroring environment, and switching the at least one IASP online at the second pair of nodes of the second mirroring environment. In this embodiment, the replicating of the at least one IASP is effected by hardware (HW) replication.

In some embodiments, replicating the at least one IASP to the second mirroring environment further includes HW replicating a first copy of the at least one IASP from a first node of the first mirroring environment to a first node of the second mirroring environment, and HW replicating a second copy of the at least one IASP from a second node of the first mirroring environment to a second node of the second mirroring environment. These embodiments facilitates those example systems where hardware replication is handled in storage, and not as part of an operating system. In such example systems, hardware replication is sometimes done from a first node of a first mirrored pair to a first node of a second mirrored pair, and likewise, from a second node of the first mirrored pair to a second node of the second mirrored pair.

In some embodiments, the method further includes, in response to registering the at least one IASP to the first node of the first HA mirroring environment, configuring an application space that is consolidated in the at least one IASP within the first mirroring environment. This advantageously allows a user of an application to leverage the disclosed methods to move its entire suite of applications from a first HA site to a second HA site, with very minimal overall down time.

In some embodiments, switching the at least one IASP offline at the pair of nodes of the first mirroring environment further includes varying off a copy of the at least one IASP offline separately at each node of the pair of nodes of the first mirroring environment. This advantageously allows the last copy to be varied off to continue to accept changes, and thus it may be placed in "tracked" mode during this time. The other copy, which was the first to be varied off of the first mirroring environment, will not have all of those changes, however, and will need to be resynchronized with the last copy to be varied off when both are brought back online at the second HA mirroring environment. Thus, in these embodiments, the method further includes, prior to switching the at least one IASP online at the pair of nodes of the second mirroring environment, performing a resynchronization between respective copies of the at least one IASP stored at each of a first node of the second pair of nodes and a second node of the second pair of nodes at the second mirroring environment.

In other embodiments, to advantageously save time, and obviate any need for such resynchronizations between the two copies of the one or more IASPs, and to further maintain complete identity and synchronization between the two copies of the databases or IASPs, the method's switching the at least one IASP offline at the pair of nodes of the first mirroring environment further includes varying off a copy of the at least one IASP offline in tandem at each node of the pair of nodes of the first mirroring environment, in a "dual vary off" operation. Further, the method then also includes switching the at least one IASP online at the pair of nodes of the second mirroring environment by varying on a copy of the at least one IASP at each node of the pair of nodes of the second mirroring environment in tandem, using a "dual vary on" operation. In dual vary off, and dual vary on, operations, the IASPs are never allowed to become out of sync, and thus when moved from one HA site to another HA site, as soon as they are dual varied on, they preserve the state they were originally in, for example, active-active, and thus fully replicating, before they were ever moved. This advantageously allows for a seamless change of the mirrored pair of IASPs from a first hosting site to a second hosting site.

According to another aspect of the first embodiment of the present disclosure, switching the at least one IASP online at the second pair of nodes of the second mirroring environment further comprises preserving a same set of states between the two nodes of the second mirroring environment that the at least one IASP had between the two nodes of the first mirroring environment before it was switched offline at the first mirroring environment. This advantageously preserves the coherency, or lack of coherency, between the two versions of the one or more IASPs that they had at the first mirroring environment, which obviates any need to recapture or reconfigure, but rather, to proceed in a seamless transition.

According to a second embodiment of the present disclosure, a system is provided. The system includes one or more computer processors, and a memory containing a program which when executed by the one or more computer processors performs an operation. The operation includes registering at least one independent auxiliary storage pool (IASP) to a first node of a first pair of nodes at a first HA mirroring environment at a first location, and replicating the at least one IASP to a second HA mirroring environment, the second HA mirroring environment including a second pair of nodes at a second location. The operation further includes registering the at least one IASP with one node of the pair of nodes of the second mirroring environment, switching the at least one IASP offline at the first pair of nodes of the first mirroring environment, and switching the at least one IASP online at the second pair of nodes of the second mirroring environment.

In some embodiments, replicating the at least one IASP to the second mirroring environment further includes HW replicating a first copy of the at least one IASP from a first node of the first mirroring environment to a first node of the second mirroring environment, and HW replicating a second copy of the at least one IASP from a second node of the first mirroring environment to a second node of the second mirroring environment. These embodiments facilitates those example systems where hardware replication is handled in storage, and not as part of an operating system. In such example systems, hardware replication is sometimes done from a first node of a first mirrored pair to a first node of a second mirrored pair, and likewise, from a second node of the first mirrored pair to a second node of the second mirrored pair.

In some embodiments, the operation switching the at least one IASP offline at the pair of nodes of the first mirroring environment further includes the operation varying off a copy of the at least one IASP offline separately at each node of the pair of nodes of the first mirroring environment. This advantageously allows the last copy to be varied off to continue to accept changes, and thus it may be placed in "tracked" mode during this time. The other copy, which was the first to be varied off of the first mirroring environment, will not have all of those changes, however, and will need to be resynchronized with the last copy to be varied off when both are brought back online at the second HA mirroring environment. Thus, in these embodiments, the operation further includes, prior to switching the at least one IASP online at the pair of nodes of the second mirroring environment, performing a resynchronization between respective copies of the at least one IASP stored at each of a first node of the second pair of nodes and a second node of the second pair of nodes at the second mirroring environment.

In other embodiments, to advantageously save time, and obviate any need for such resynchronizations between the two copies of the one or more IASPs, and to further maintain complete identity and synchronization between the two copies of the databases or IASPs, the operation's switching of the at least one IASP offline at the pair of nodes of the first mirroring environment further includes the operation varying off a copy of the at least one IASP offline in tandem at each node of the pair of nodes, in a "dual vary off" operation. Further, the operation then also includes switching the at least one IASP online at the pair of nodes of the second mirroring environment by varying on a copy of the at least one IASP at each node of the pair of nodes in tandem, using a "dual vary on" operation. In dual vary off, and dual vary on, operations, the IASPs are never allowed to become out of sync, and thus when moved from one HA site to another HA site, as soon as they are dual varied on, they preserve the state they were originally in, for example, active-active, and thus fully replicating, before they were ever moved. This advantageously allows for a seamless change of the mirrored pair of IASPs from a first hosting site to a second hosting site, using this system and operation of the second embodiment of this disclosure.

According to a third embodiment of the present disclosure, a computer-readable storage medium is provided. The computer-readable storage medium has computer-readable program code embodied therewith, the computer-readable program code executable by one or more computer processors to perform an operation. The operation includes registering at least one independent auxiliary storage pool (IASP) to a first node of a first pair of nodes at a first HA mirroring environment at a first location, and replicating the at least one IASP to a second HA mirroring environment, the second HA mirroring environment including a second pair of nodes at a second location. The operation further includes registering the at least one IASP with one node of the pair of nodes of the second mirroring environment, switching the at least one IASP offline at the first pair of nodes of the first mirroring environment, and switching the at least one IASP online at the second pair of nodes of the second mirroring environment.

Other aspects of the operation performed by the execution of the computer-readable program code of the computer-readable storage medium may also be performed, as described above for the operation of the system of the second embodiment of the present disclosure, for the same advantageous reasons.

BRIEF DESCRIPTION OF THE SEVERAL VIEWS OF THE DRAWINGS

FIG. 4 is a flow diagram illustrating a method of moving an IASP stored on a pair of nodes of a first active Db2 mirroring environment at a first location to a pair of nodes of a second active Db2 mirroring environment at a geographically remote second location, preserving the coherency state that the IASP had between the nodes of the first Db2 mirroring environment to the nodes of the second Db2 mirroring environment, according to one embodiment disclosed herein.

FIG. 5 is a flow diagram illustrating a method of moving an IASP respectively stored on the two nodes of a first active Db2 mirroring environment at a first location to the two nodes of a second active Db2 mirroring environment at a second location, using a dual vary off operation at the nodes of the first active Db2 mirroring environment and a dual vary on operation at the nodes of the second active Db2 mirroring environment.

DETAILED DESCRIPTION

Figure 1A:
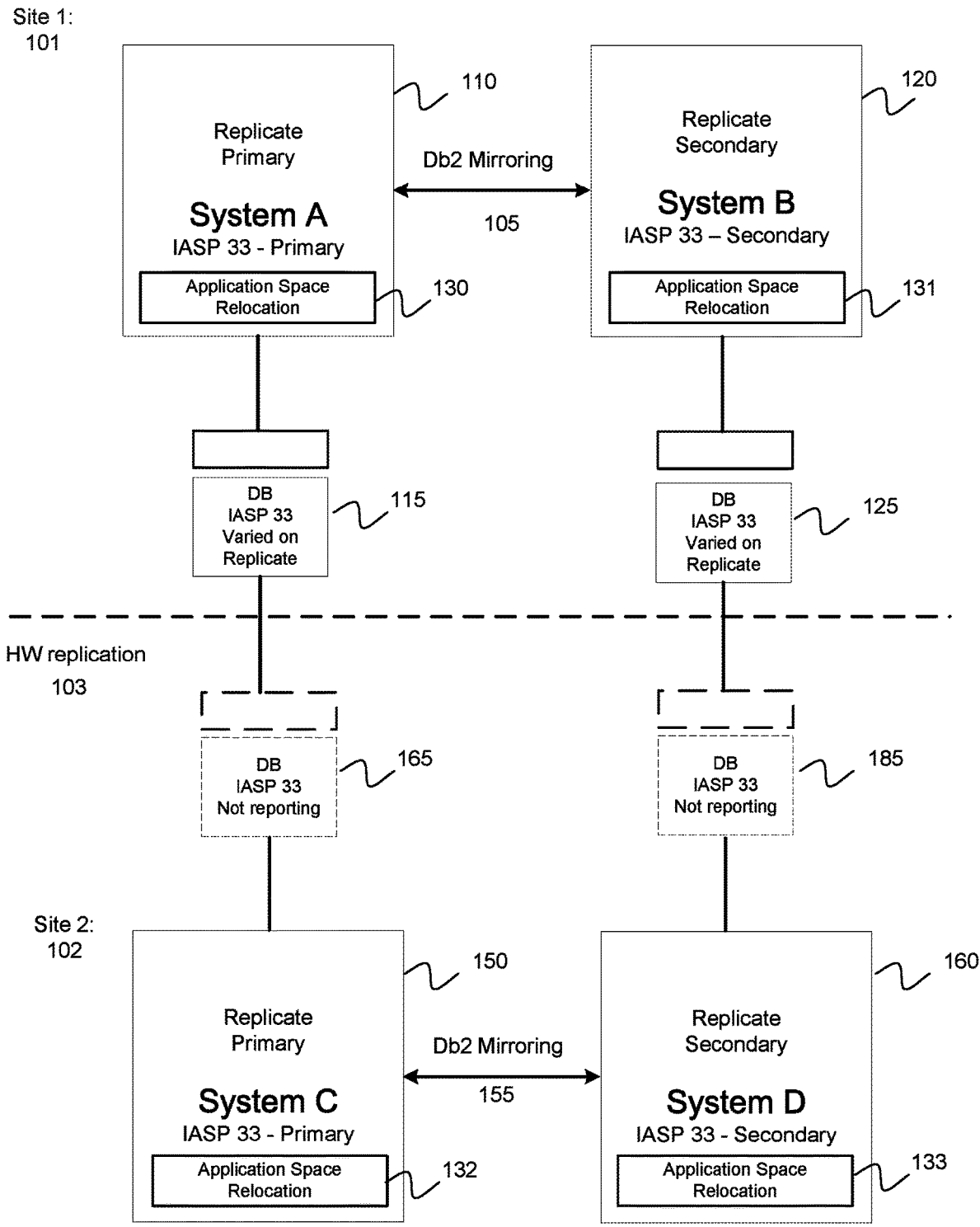
FIG. 1A illustrates an example pair of nodes in a first mirrored environment at a first location, and a second example pair of nodes in a second mirrored environment, at a second geographically remote location, prior to a switch of a mirrored database from the first location to the second location, according to one embodiment disclosed herein.

In embodiments, the ability to have two separate Db2 Mirror pair environments, each providing HA, which have the capability to switch application spaces between the Db2 Mirror pairs, is presented. In embodiments, this capability may be used, for example, for disaster recovery, or, for example, for planned maintenance. In embodiments, a HA environment at one location may be easily be moved to a separate HA environment at a second location essentially without prolonged interruption. In some embodiments, the second location may be geographically remote or distant from the first location, and in other embodiments it may be proximate, even in the same room. In accordance with various embodiments, the problem of maintaining HA by allowing the entire HA environment to be switched over to a separate and potentially distant HA environment, and subsequently brought back to an active state, with limited interruption and a minimal amount of resynchronization of the environment, is facilitated.

In embodiments, an application space may consolidated within one or more IASPs, or similar concept or structure. The one or more IASPs or equivalent structures may be registered with one node of a Db2 mirrored pair of HA nodes, and thus replicated to the other node via Db2 mirroring. Moreover, in embodiments, the IASP or equivalent structure may also be replicated to a geographically distant HA node of a second Db2 mirroring pair of nodes, using hardware replication.

In embodiments, at each of the geographically distant locations, a separate Db2 Mirroring configuration may be established, and the application space stored in the one or more IASPs may be configured within one of those Db2 mirroring environments. Then, hardware replication may be used to replicate the one or more IASPs that contains the application space from the original configuration at a first site, for example, to the nodes within the other established Db2 mirroring environment, at a second site. Once the hardware replication has been configured between the two remote Db2 mirroring sites, one or more IASPs can then be registered with the other Db2 mirroring environment, at the second site. The one or more IASPs may then be taken offline from each of the nodes at the first Db2 mirroring environment, at the first site. At the second site the application space may be brought back on line, with Db2 mirroring of the one or more IASPs reestablished at the two nodes of the second site. This process obviates any need for any complete/full replication of the application spaces within the Db2 mirroring environment.

As described more fully below, in some embodiments hardware replication is handled in storage, and not via an operating system. As a result, in such embodiments hardware replication of the one or more IASPs needs to be done from each of the two nodes in the first HA environment to each of the two nodes in the second HA environment.

Thus, in embodiments, the only downtime in switching the HA environments between the two sites is the time required to take the one or more IASPs off line and then back on line, plus the time needed for a brief partial synchronization of the tracked changes which may have occurred between the processing of being taken off line and back on line. In alternate embodiments where dual vary processing is supported and used, the brief partial synchronization of tracked changes made to one copy of the IASP is eliminated.

In embodiments, a HA environment may be detached from a source site and brought up on a target site which can then be used for testing (or other purposes) without impacting the original source site. The detached environment may later be reattached and brought back in sync with the original HA site when the purpose of the detached copy is complete.

FIG. 1A illustrates two example mirroring environments, Site 1 101 and Site 2 102, according to one embodiment disclosed herein. With reference to FIG. 1A, Site 1 101 includes a first example system 110, System A, and a second example system 120, System B. System A and System B are in a mirroring environment, as shown by arrow 105. A mirroring environment is a continuous availability solution which offers the ability to keep database files synchronized between two nodes and can provide a recovery time objective close to zero. As shown in FIG. 1, the mirroring environment may be the "Db2 Mirror" solution provided by IBM Corporation. Stored on each of System A 110 and System B 120, respectively, is a copy of a database. The database is an independent auxiliary storage pool, or IASP, which is a collection of disk units that can be brought online or taken offline and kept independent of the rest of the data on a storage system. The example database in FIG. 1 is labeled "IASP 33." At Site 1 101, one copy of IASP 33 115 is stored on System A 110, and a second copy of IASP 33 125 is stored on System B 120. Due to the mirroring environment, the two copies 115, 125 are in sync and identical, indicated by the term "replicate" appearing on each of the two copies of IASP 33. Thus a change made by a user on System A to IASP 33 115, is immediately replicated on IASP 33 125 stored on System B. Both copies of IASP 33 are in an active state, which means they are available to be changed. The fact that they are on and operative on their two respective systems is indicated by the term "varied on" provided on each copy of IASP 33. As described more fully below, in some embodiments, the two copies of IASP 33 may be varied on and varied off in tandem, thereby insuring their synchronization when taken offline, as well as when put back online.

Continuing with reference to FIG. 1A, System A and System B are each provided with application space relocation 130 and 131, respectively. Application space relocation 130, 131 facilitates hardware replication of one or more IASPs from a first site, for example Site 1 101, to a second site, for example Site 2 102. The elements and functionality of application space relocation 130, 131 are described more fully below, with reference to FIG. 2.

Also shown in FIG. 1A is a second site, Site 102. In one or more embodiments, Site 2 may be a disaster recovery (DR) site, which can assume some or all of the operations of Site 1 101, if need be. With reference to FIG. 1A, Site 2 102 includes a first example system 150, System C, and a second example system 160, System D. System C and System D are in a mirroring environment, as shown by arrow 155. As was the case with Systems A and B, described above, and as shown in FIG. 1, the mirroring environment may be the "Db2 Mirror" solution provided by IBM Corporation. Stored on each of System C 150 and System D 160, respectively, is a copy of a database, here also, as in Site 1 101, an IASP, IASP 33. At Site 2 102, one copy of IASP 33 165 is stored on System C 150, and a second copy of IASP 33 185 is stored on System D 160. Due to the mirroring environment, the two copies of IASP 33 165, 185 could be placed in sync and be identical, but here at Site 2 102 both of them are not online, and thus labelled as "not reporting." To further indicate the potential, but not actual, operation of these databases, they are each outlined in a dashed line. As described more fully below, in some embodiments, the two copies of IASP 33 stored at Site 2 may be varied on and varied off in tandem, thereby insuring their synchronization when taken online, as well as when taken offline, if and when that occurs.

Thus, FIG. 1A illustrates a situation where IASP 33 has been replicated, via hardware replication 103, at each of System C and System D, but neither copy of IASP 33 has yet been activated at Site 2 102. Thus, FIG. 1A illustrates a situation just before a switchover form Site 1 to Site 2, in accordance with various embodiments.

Continuing with reference to FIG. 1A, System C 150 and System D 160 are each provided with application space relocation 132 and 133, respectively. Application space relocation 132, 133 facilitates hardware replication of one or more IASPs from a first site, for example Site 1 101, to a second site, for example Site 2 102. The elements and functionality of application space relocation 132, 133 are described more fully below, with reference to FIG. 2.

Figure 1B:
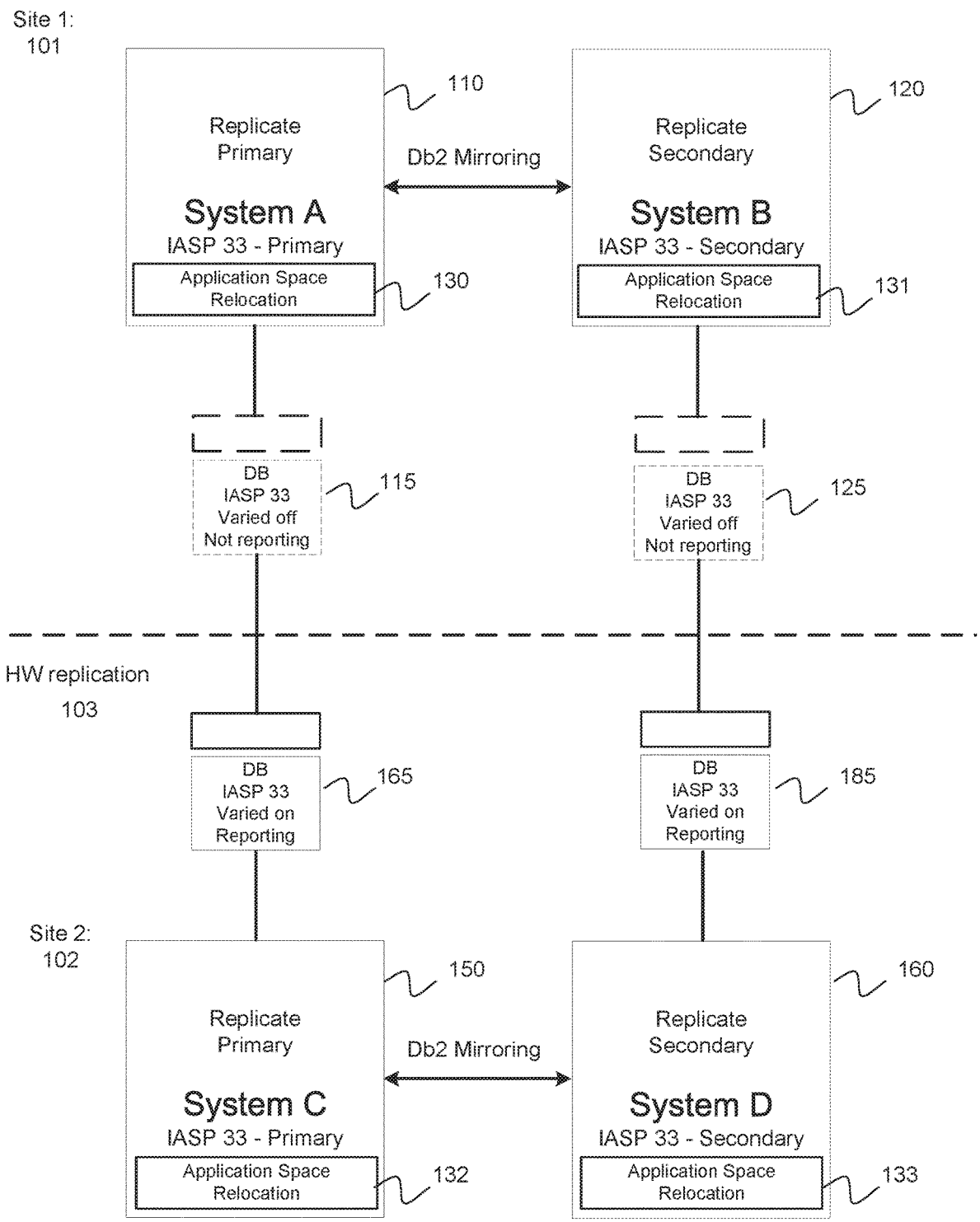
FIG. 1B illustrates the example pair of nodes in the first mirrored environment at the first location, and the second example pair of nodes in the second mirrored environment, at the second geographically remote location of FIG. 1 after a switch of the mirrored database has occurred from the first location to the second location, according to one embodiment disclosed herein.

FIG. 1B is essentially equal to FIG. 1A, except that it illustrates the situation just after a switchover from Site 1 to Site 2, in accordance with various embodiments. With reference to FIG. 1B, only the differences with FIG. 1A will be described, as all unchanged aspects of FIG. 1B have already been explained above.

With reference to FIG. 1B, database IASP 33 has been varied off of Site 1 101, and has been varied on at Site 2 102. This is shown by the copies of IASP 33 115, 125 provided at System A 110 and System B 120, respectively, now having been taken offline, as indicated by their each being labeled as "varied off" and "not reporting." To further indicate that these databases 115, 125 are no longer operative, they are each outlined in a dashed line in FIG. 1B, as was the cases for IASPs 165, 185 in FIG. 1A.

Similarly, at Site 2 102, database IASP 33 165, stored on System C 150, is now varied on and reporting. Database IASP 33 185, stored on System D 160, is also now varied on and reporting. Following a hardware replication of these respective databases from Systems A and B, to Systems C and D respectively, using application space relocation 130 and 131, at each of Systems A and B respectively, the database copies at Site 1 were then taken offline, and the copies of the same database at Site 2 were taken online, in accordance with various embodiments disclosed herein. In one or more embodiments, following the hardware replication and registration of the copies of the database at Site 2, varying off the copies of the database IASP 33 115, 125 may be performed separately or in tandem, using a dual vary off operation, and varying on of the copies of the databases IASP 33 165, 185 may be performed separately or in tandem, using a dual vary on operation. This is described below with reference to FIG. 3.

Figure 2:
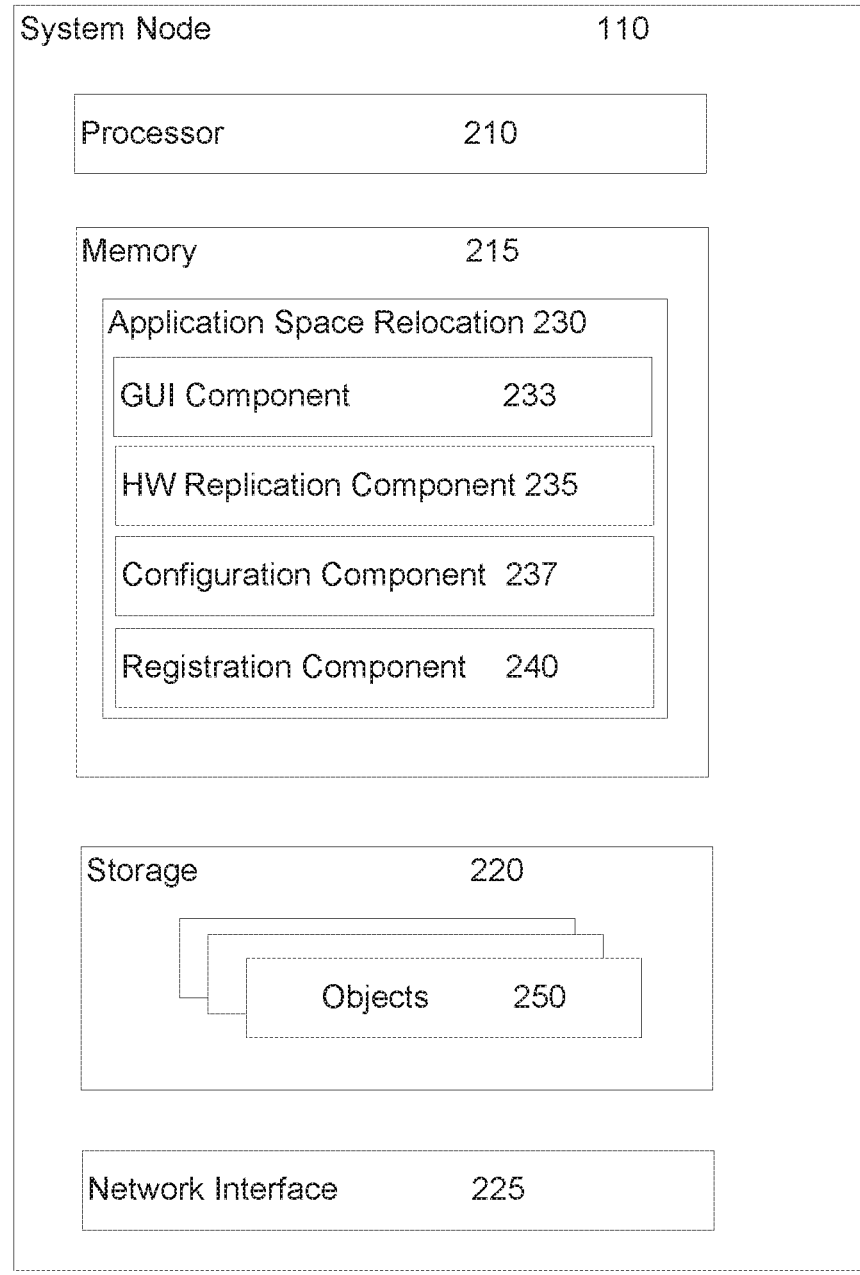
FIG. 2 is a block diagram illustrating detail of one of the example nodes of FIG. 1 configured to execute application space relocation, according to one embodiment disclosed herein.

FIG. 2 is a block diagram illustrating an example System Node 110 configured to provide application space relocation, according to one embodiment disclosed herein. System Node 110 may be, for example, any system node shown in FIGS. 1A and 1B, as described above. In the illustrated embodiment, the System Node 110 includes a Processor 210, Memory 215, Storage 220, and a Network Interface 225. In the illustrated embodiment, the Processor 210 retrieves and executes programming instructions stored in Memory 215, as well as stores and retrieves application data residing in Storage 220. The Processor 210 is generally representative of a single CPU, multiple CPUs, a single CPU having multiple processing cores, and the like. The Memory 215 is generally included to be representative of a random access memory. Storage 220 may be disk drives or flash-based storage devices, and may include fixed and/or removable storage devices, such as fixed disk drives, removable memory cards, or optical storage, network attached storage (NAS), or storage area network (SAN). Storage 220 may include one or more data bases, including IASPs. Via the Network Interface 225, the System Node 110 can be communicatively coupled with one or more other devices and components, such as other System Nodes 110, monitoring nodes, storage nodes, and the like.

In the illustrated embodiment, the Storage 220 includes a set of Objects 250. Although depicted as residing in Storage 220, in embodiments, the Objects 250 may reside in any suitable location. In embodiments, the Objects 250 are generally representative of any data (e.g., application data, saved files, databases, and the like) that is maintained and/or operated on by the System Node 110. As noted, Objects 250 may include IASP 33. As illustrated, the Memory 215 includes an Application Space Relocation application 230. Although depicted as software in Memory 215, in embodiments, the functionality of the Application Space Relocation application 230 can be implemented in any location using hardware, software, or a combination of hardware and software. Although not illustrated, the Memory 215 may include any number of other applications used to create and modify the Objects 250 and perform system tasks on the System Node 110.

As illustrated, the Application Space Relocation application 230 includes a GUI Component 233, a HW Replication Component 235, a Configuration Component 237 and a Registration Component 240. Although depicted as discrete components for conceptual clarity, in embodiments, the operations and functionality of the GUI Component 233, HW Replication Component 235, Configuration Component 237 and Registration Component 240 may be combined or distributed across any number of components. In an embodiment, the Application Space Relocation application 230 is generally used to implement the replication of database objects of Objects 250 from a first mirroring environment to a second mirroring environment. In an embodiment, the Application Space Relocation application 230 is also generally used to configure an application space that is consolidated in a database object of Objects 250 within a mirroring environment, as well as to register database objects of Objects 250 in a newly switched to mirroring environment, such as, for example Site 2 102 of FIGS. 1A and 1B.

In an embodiment, the GUI Component 233 is used to generate and output graphical user interfaces (GUIs) for users, as well as receive input from users. In one embodiment, users can use the GUI Component 233 to send a command to utilize hardware replication to replicate an IASP from a first node of a mirrored pair of nodes in a first mirroring environment to a second node of a mirrored pair of nodes in a second mirroring environment, and to receive messages from any system node, e.g., System A 110, System B 120, System C 150 or System D 160, all of FIGS. 1A and 1B regarding the successful hardware replication and subsequent registration of a database object of Objects 250 dual vary processing. In some embodiments, the GUI Component 233 provides messaging regarding pending hardware replication processes relating to an IASP that is the subject of an application space relocation operation, and requests user input regarding performing those operations.

In the illustrated embodiment, the HW Replication Component 235 receives information from the GUI Component 233 (e.g., input by a user), or from other applications. For example, in the case of a user command to perform hardware replication of one or more IASPs from a first mirrored pair of HA nodes to a second pair of HA nodes, the HW Replication Component 235 implements the user command. As noted above, to move a database object from one mirrored environment to another, in actuality both nodes of a first mirrored environment each need to have the database object respectively to the two nodes of the second mirrored environment. Thus, in the illustrated embodiment, the HW Replication Component 235 receives both such commands via GUI Component 233, as well as reports on their progress and completion via GUI Component 233.

As noted above, in accordance with various embodiments, database objects are hardware replicated from a first node of a source mirroring environment to a first node of a target mirroring environment, and copies of the same database objects are hardware replicated from a second node of the source mirroring environment to a second node of the target mirroring environment. Once replicated, the database objects are then registered with the target mirroring environment, and in the illustrated embodiment, this is performed by the Registration Component 240.

As noted above, if an application space is consolidated within one or more IASPs, then, in embodiments, the entire application space may be moved form a source HA mirroring environment to a geographically remote target HA mirroring environment, such as, for example, for disaster recovery purposes. In one embodiment, the Configuration Component 237 configures such an application space in the source mirroring environment, which may be performed, for example, on either node of the mirrored pair of nodes at the source mirroring environment. In one embodiment, once configured, after copies of the database at the source HA mirroring environment are respectively hardware replicated over to the target HA mirroring environment, they are registered with the target HA mirroring environment via the Registration Component 240, and then brought back online at the target HA mirroring environment. The registration may be performed on either node of the target HA mirroring environment. Once brought back online at the target HA mirroring environment, the application space is reestablished at the target HA mirroring environment, without any need for any complete or full replication of the application spaces within the target HA mirroring environment. It is noted that even without dual vary support, as described more fully below, in embodiments, a HA environment at the second location may be brought back in sync with simply a partial resynchronization of tracked changes. This is a significant advantage, inasmuch as, using the example of FIG. 1B, currently available solutions actually require the entire contents of the IASP at System C to be fully replicated over to System D from scratch so as to get the HA environment back in sync.

Thus, continuing with reference to the example of FIG. 1B, in embodiments, once the HW replication has been set up and the IASP has been registered with the Db2 monitoring environment at Site 2, for example, the HA environment may be switched back and forth without any further need for reconfiguration.

Figure 3:
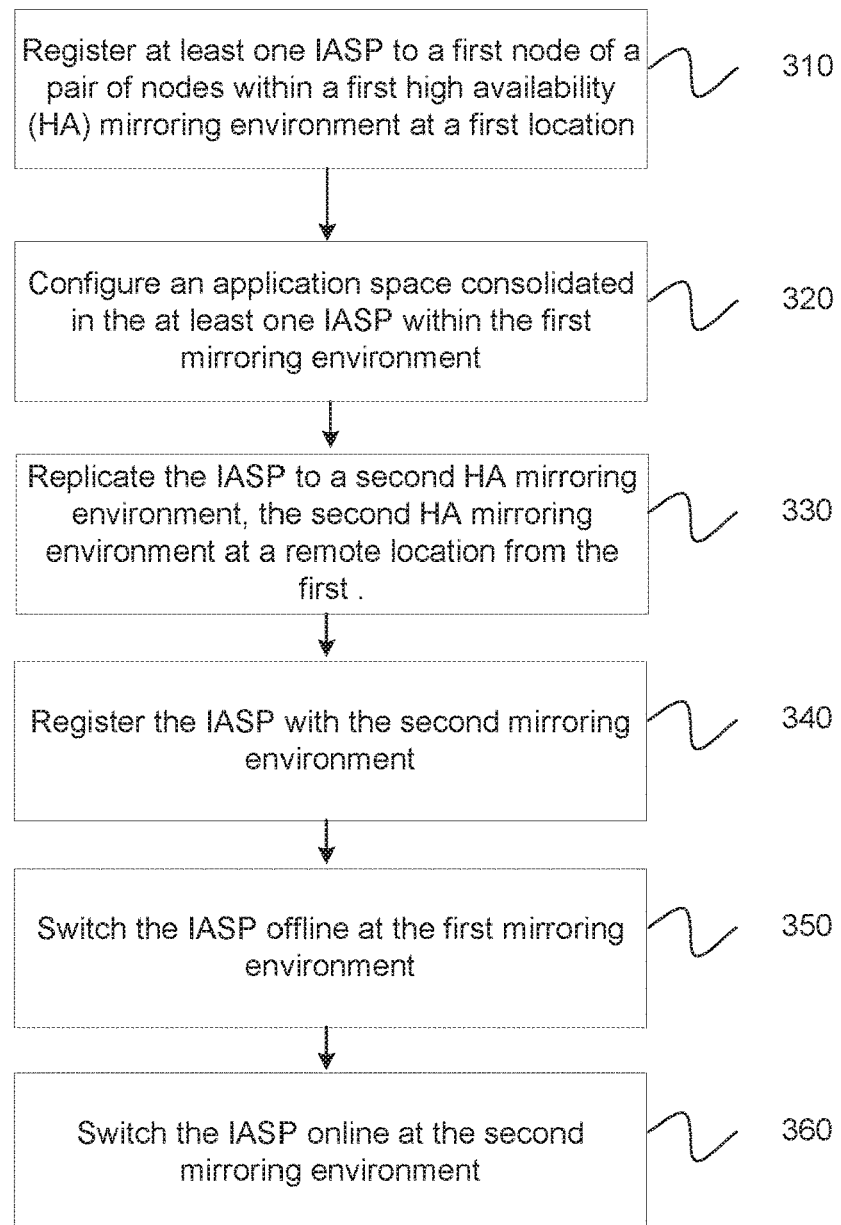
FIG. 3 is a flow diagram illustrating a method of replicating an IASP space from a first HA mirroring environment at a first location to a second HA mirroring environment at a geographically remote second location, according to one embodiment disclosed herein.

FIG. 3 is a flow diagram illustrating a method 300 of moving an application space from a first HA mirrored environment to a geographically remote second HA mirrored environment, according to one embodiment disclosed herein. In the example of FIG. 3, the application space is wholly consolidated within one IASP. Method 300 includes blocks 310 through 360. In alternate embodiments method 300 may have more, or fewer blocks.

Continuing with reference to FIG. 3, method 300 begins at block 310, where at least one IASP is registered to a first node of a pair of nodes within a first HA mirroring environment at a first location. For example, the IASP may be IASP 33 of FIG. 1A, and it may be registered to the pair of nodes comprising System A 110 and System B 120 at Site 1 101.

From block 310 method 300 proceeds to block 320, where an application space consolidated in the at least one IASP within the first mirroring environment is configured. For example, the application space may be configured using the Configuration Component 237, of Application Space Relocation application 230, of the example system node 110 of FIG. 2.

From block 320 method 300 proceeds to block 330, where the IASP is HW replicated to a second HA mirroring environment, the second HA mirroring environment at a remote location from the first. For example, with reference to FIG. 1A, IASP 33 115 may be HW replicated from System A 110 to System C 150, the result of which is IASP 33 165, and IASP 33 125 may be HW replicated from System B 120 to System D 160, the result of which is IASP 33 185. For example, the HW replication may be performed by, or in conjunction with, an instance of HW Replication Component 235 of FIG. 2, respectively provided within Application Space Relocation application 130 and 131, of System A 110 and System B 120, both of FIG. 1A.

From block 330 method 300 proceeds to block 340, where the IASP is registered within the second mirroring environment. For example, with reference to FIG. 1A, IASP 33 may be registered at the mirroring pair of Site 2 102, at either node of the pair, e.g., System C or System D, using Application Space Relocation application 132 or 133, respectively, and in particular, using the Registration Component 240, of Application Space Relocation application 230, of the example system node 110 of FIG. 2.

From block 340 method 300 proceeds to block 350, where the IASP is switched offline at the first mirroring environment. For example, this is shown in the upper portion of FIG. 1B, where IASPs 115 and 125 are varied off of each of nodes System A and System B, respectively. As described below with reference to FIG. 5, the vary off operation may be performed one node at a time, or it may be performed in tandem, using a dual vary off operation.

From block 350 method 300 proceeds to block 360, where the IASP is switched online at the second mirroring environment. For example, this is shown in the lower portion of FIG. 1B, where IASPs 165 and 185 are varied on at each of nodes System C 150 and System D 160, respectively. As described below with reference to FIG. 5, the vary on operation may be performed one node at a time, or it may be performed in tandem, using a dual vary on operation.

FIG. 4 is a flow diagram illustrating a method 400 of moving an IASP stored on a pair of nodes of a first active Db2 mirroring environment at a first location to a pair of nodes of a second active Db2 mirroring environment at a geographically remote second location, preserving the coherency state that the IASP had between the nodes of the first Db2 mirroring environment to the nodes of the second Db2 mirroring environment, according to one embodiment disclosed herein.

Method 400 includes blocks 410 through 440. In alternate embodiments method 400 may have more, or fewer blocks. Continuing with reference to FIG. 4, method 400 begins at block 410, where an IASP stored on each of a pair of nodes of a first active Db2 mirroring environment at a first location is replicated to a pair of nodes in a second Db2 mirroring environment at a second location, the second location remote from the first, the IASP in either a coherent state or a non-coherent state between the nodes of the first Db2 mirroring environment at a first site. For example, with reference to FIG. 1A, IASP 33 115 and IASP 125 are in an active-active mirroring state at Site 1 101. It is desired that when these IASPs are switched to a second Db2 mirroring site, i.e., Site 2 102, that their state be preserved, and when brought back online, they are once again in an active-active state at the second Db2 mirroring site.

From block 410 method 400 proceeds to block 420, where the IASP is registered within the second Db2 mirroring environment. For example, with reference to FIG. 1A, IASP 33 may be registered at the mirroring pair of Site 2 102, at either node of the pair, e.g., System C or System D, using Application Space Relocation application 132 or 133, respectively, and in particular, using the Registration Component 240, of Application Space Relocation application 230, of the example system node 110 of FIG. 2.

From block 420 method 400 proceeds to block 430, where the IASP is switched offline at the first Db2 mirroring environment. For example, this is shown in the upper portion of FIG. 1B, where IASPs 115 and 125 are both varied off of each of nodes System A and System B, respectively. In one or more embodiments, this switch off is performed using a vary off operation.

From block 430 method 400 proceeds to block 440, where the IASP is switched online at the second Db2 mirroring environment, for example Site 2 102 of FIG. 1B, preserving the same coherent or non-coherent state of the IASP between nodes of the second Db2 mirroring environment that the IASP had between the nodes of the first Db2 mirroring environment. For example, the state may be active-active, as described above, and as shown in FIG. 1B, where both System C and System D are showing "replicate", or for example, the relative state of the two IASPs may be active-passive, or, for example, one IASP may be in a blocked state, and the other IASP in a tracked state. In this latter example, it is necessary to resynchronize the two databases, and thus critical to preserve their states when brought online at the second Db2 mirroring environment. In one or more embodiments, this switch off is performed using a vary on operation.

In one or more embodiments, when performing the vary on operation, a minimal amount of resynchronization is required between the two IASPs. This is because there is a short time interval between varying off a first of the IASPs at block 430 and varying off the second of the IASPs at block 430. In that time interval the first IASP to be varied off is put into a blocked state, and the second IASP is put into a tracked state. When the two IASPs are varied back on at the new Db2 mirroring site, e.g., Site 2 102 of FIG. 1B, a resynchronization from the last IASP to be varied off to the first IASP to be varied off is required, to mirror over any changes to the IASP that occurred during that short time interval.

In some embodiments, resynchronization from the last IASP to be varied off to the first IASP to be varied off is obviated by using dual vary processing. This is the subject of method 500 of FIG. 5.

FIG. 5 is a flow diagram illustrating a method 500 of moving an IASP respectively stored on the two nodes of a first active Db2 mirroring environment at a first location to the two nodes of a second active Db2 mirroring environment at a second location, using a dual vary off operation at the nodes of the first active Db2 mirroring environment and a dual vary on operation at the nodes of the second active Db2 mirroring environment. Method 500 thus performs switching off of IASPs as well as switching on of IASPs in tandem, in what is known as "dual vary off" and "dual vary on" processing, or collectively, "dual vary" processing. Prior to describing method 500, some background on dual vary is first presented.

In some embodiments, techniques to perform vary on and vary off operations, where two nodes in a mirrored environment act in tandem, are provided. Such tandem operations are referred to herein as "dual vary", or, more precisely, "dual vary on" and "dual vary off", respectively. As noted above, standard vary off and vary on operations create an exposure during resynchronization, where only one of the databases is up to date. The other, having been brought offline first, is thus in a blocked state. If the resynchronization source system node experiences a power failure, the tracked changes to its (more current) version of the database may be lost. Accordingly, in embodiments, to avoid this exposure during resynchronization, as well as to remove the problems in marking the database as stored on one of the HA mirroring pair of system nodes as "blocked" and the other version of the database, stored on the other system node of the mirrored pair as "tracked", the ability to take a pair of Db2 Mirrored databases offline together, e.g., a dual vary off, is provided. In such embodiments, the two databases remain absolutely in sync and can later be brought back online together, both being in an equal state, and this not requiring resynchronization. In such embodiments, each of the mirrored systems maintains a viable backup in the event of a failure. As a result, when the mirrored pair is taken offline, whether for disaster recovery or other purposes, both systems are in sync, and a subsequent "dual vary on" process may begin on either of them.

In embodiments, a dual vary implementation may be accomplished by adding specific hooks within vary on and vary off processing of databases on system nodes so as to coordinate that processing across the two Db2 Mirrored nodes. In embodiments, this allows for two Db2 Mirrored nodes to remain absolutely in sync and for either node to take over in the event of a failure while maintaining consistency. In such embodiments, there is no exposure to a single node event as there is when a required resynchronization is in progress. Additionally, if both Db2 Mirrored databases are brought offline together and remain absolutely in sync (whether the two databases remain on the same nodes, or, for example, if they switch over to a separate pair of disaster recovery nodes) in the event that only a single database is subsequently brought online before the other database, either one of them may be the one brought online first and made available for updates. This contrasts with the current requirement, as noted above, that if Db2 Mirrored databases are brought offline one after the other, it is only the last one that went offline that is available to be brought online to be available for updates, whereas the first database to go offline would be in a blocked state, and not available for updates.

Thus, according to some embodiments, for example, a system includes one or more computer processors, and a memory containing a program which when executed by the one or more computer processors performs an operation. The operation includes initiating, at a first node of a pair of nodes in a mirroring environment, a dual vary off operation of a database, a copy of the database being stored on each of the first node of the pair of nodes and a second node of the pair of nodes, the operation to be performed in tandem with the second node. The operation further includes, at the first node, informing the copy of the database stored on the first node of the dual vary off operation, and informing an operating system of the dual vary off operation. The operation still further includes waiting for an indication from the second node that it has completed its vary off operation, and in response to the indication from the second node, completing the dual vary off operation. In such embodiments, a related method may also be performed.

In some embodiments, for example, a computer-readable storage medium is provided. The computer-readable storage medium has computer-readable program code embodied therewith, the computer-readable program code executable by one or more computer processors to perform an operation. The operation includes receiving, at a first node of a pair of nodes in a mirroring environment, a dual vary on command indicating to perform a vary on operation on a database in tandem with a second node of the pair of nodes. The operation further includes inform a second node of the pair of nodes to initiate dual vary on processing, and receiving an indication from the second node to continue with the dual vary on processing. The operation still further includes waiting for an indication from the second node that it is ready to complete the dual vary on operation, and, in response to the indication from the second node, completing the dual vary on operation. In such embodiments, a related method may also be performed.

Continuing with reference to FIG. 5, method 500 includes blocks 510 through 540. In alternate embodiments method 500 may have more, or fewer blocks. Method 500 begins at block 510, where an IASP stored on a first active Db2 mirroring environment at a first location is replicated to a second Db2 mirroring environment at a second location, the second location remote from the first, the IASP in an active-active state on the two nodes of the first Db2 mirroring environment. For example, with reference to FIG. 1A, IASP 33 115 and IASP 125 are in an active-active mirroring state at Site 1 101. It is desired that when these IASPs are switched to a second Db2 mirroring site, i.e., Site 2 102, that their state be preserved, and when brought back online, they are once again in an active-active state at the second Db2 mirroring site. It is also desired that the IASP be brought back online in the shortest possible time.

From block 510 method 500 proceeds to block 520, where the IASP is registered within the second Db2 mirroring environment. For example, with reference to FIG. 1A, IASP 33 may be registered at the mirroring pair of Site 2 102, at either node of the pair, e.g., System C or System D, using Application Space Relocation application 132 or 133, respectively, and in particular, using the Registration Component 240, of Application Space Relocation application 230, of the example system node 110 of FIG. 2.

From block 520 method 500 proceeds to block 530, where the IASP is varied off of the two nodes of the first Db2 mirroring environment in tandem, in a dual vary operation. For example, this is partially shown in the upper portion of FIG. 1B, where IASPs 115 and 125 are both varied off of each of nodes System A and System B, respectively. As described above, using the dual vary off operation insures that, as varied off, the two copies of IASP 33, 115 and 125, are wholly identical and in sync. As a result, if they are also brought back online in tandem, there is no need to perform any resynchronization between them.

From block 530 method 500 proceeds to block 540, where the IASP is varied on in tandem at the two nodes of the second Db2 mirroring environment, using a dual vary on operation, preserving the active-active state of the IASP between the two nodes of the second Db2 mirroring environment. For example, as shown in FIG. 1B, where both System C and System D are showing "replicate", their state is active-active. Because the two copies of IASP 33 were brought back on line together, in the dual vary on operation, it is not necessary to resynchronize the two databases, thus, shortening the time it takes to move from the first Db2 mirroring environment to the second Db2 mirroring environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Thus, in one or more embodiments, an entire HA environment may be moved to a geographically distant disaster recovery site. In one or more embodiments, one or more databases may switch sites without regard to their mutual state (i.e., suspended or active) in the HA environment. Once moved, in one or more embodiments, a partial synchronization of tracked changes after switching environments may be performed. However, this may be avoided in embodiments using dual vary processing. Thus, in such embodiments, the only down time for the HA environment is the amount of time needed to bring the environment offline and back online after the switch from a first site to a second site. In one or more embodiments, a copy of the entire HA environment may be detached, and subsequently used for testing or other purposes.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., Application Space Relocation application 130 of FIG. 1A) or related data available in the cloud. For example, the Application Space Relocation application could execute on a computing system in the cloud and be used to perform moving of one or more databases, including all applications fully consolidated in them, from a first HA mirroring site to a second HA mirroring site. In such a case, the Application Space Relocation application could be used to transfer application spaces between any two remote sites via the cloud and store an indication of such transfer at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   registering at least one independent auxiliary storage pool (IASP) to a first node of a first pair of nodes at a first HA mirroring environment at a first location;
   replicating the at least one IASP to a second HA mirroring environment, the second HA mirroring environment including a second pair of nodes at a second location;
   registering the at least one IASP with one node of the pair of nodes of the second mirroring environment;
   switching the at least one IASP offline at the first pair of nodes of the first mirroring environment and varying off a copy of the at least one IASP offline separately at each node of the first pair of nodes; and
   switching the at least one IASP online at the second pair of nodes of the second mirroring environment.

2. The method of claim 1, wherein replicating the at least one IASP to the second mirroring environment further comprises:
   replicating a first copy of the at least one IASP from a first node of the first mirroring environment to a first node of the second mirroring environment, and
   replicating a second copy of the at least one IASP from a second node of the first mirroring environment to a second node of the second mirroring environment.

3. The method of claim 1, wherein an application space is consolidated in the at least one IASP.

4. The method of claim 3, further comprising in response to registering the at least one IASP to the first node of the first HA mirroring environment, configuring an application space stored in the at least one IASP within the first mirroring environment.

5. The method of claim 1, further comprising, prior to switching the at least one IASP online at the pair of nodes of the second mirroring environment, performing a resynchronization between respective copies of the at least one IASP stored at each of a first node of the second pair of nodes and a second node of the second pair of nodes.

6. The method of claim 1, wherein switching the at least one IASP online at the pair of nodes of the second mirroring environment further comprises varying on a copy of the at least one IASP at each node of the pair of nodes in tandem.

7. The method of claim 1, wherein the at least one IASP is replicated to the second HA mirroring environment for disaster recovery.

8. The method of claim 1, wherein switching the at least one IASP online at the second pair of nodes of the second mirroring environment further comprises preserving a same set of states between the two nodes of the second mirroring environment that the at least one IASP had between the two nodes of the first mirroring environment before it was switched offline at the first mirroring environment.

9. A system, comprising:
   one or more computer processors; and
   a memory containing a program which when executed by the one or more computer processors performs an operation, the operation comprising:
   registering at least one IASP to a first node of a first pair of nodes at a first HA mirroring environment at a first location;
   replicating the at least one IASP to a second HA mirroring environment, the second HA mirroring environment including a second pair of nodes at a second location;
   registering the at least one IASP with one node of the pair of nodes of the second mirroring environment;
   switching the at least one IASP offline at the first pair of nodes of the first mirroring environment; and
   switching the at least one IASP online at the second pair of nodes of the second mirroring environment and varying on a copy of the at least one IASP offline at each node of the second pair of nodes in tandem.

10. The system of claim 9, wherein replicating the at least one IASP to the second mirroring environment further comprises:
    replicating a first copy of the at least one IASP from a first node of the first mirroring environment to a first node of the second mirroring environment, and replicating a second copy of the at least one IASP from a second node of the first mirroring environment to a second node of the second mirroring environment.

11. The system of claim 9, wherein an application space is consolidated in the at least one IASP.

12. The system of claim 11, the operation further comprising, in response to registering the at least one IASP to the first node of the first HA mirroring environment, configuring an application space stored in the at least one IASP within the first mirroring environment.

13. A computer-readable storage medium having computer-readable program code embodied therewith, the computer-readable program code executable by one or more computer processors to perform an operation comprising:

associating a first IASP with a first node of a first HA mirroring environment;

associating a second IASP with a second node of the first HA mirroring environment, wherein the second IASP is replicated from the first IASP via a mirroring process;

associating a third IASP with a first node of a second HA mirroring environment, wherein the third IASP is replicated from one of the first IASP or the second IASP;

associating a fourth IASP with a second node of the second HA mirroring environment, wherein the fourth IASP is replicated from the third IASP via a mirroring process;

taking the first IASP and the second IASP offline, wherein the first IASP is taken offline before the second IASP is taken offline; and bringing the third IASP and the fourth IASP online.

14. The computer-readable storage medium of claim 13, the operation further comprising:

in response to associating the first IASP with the first node of the first HA mirroring environment, configuring an application space stored in the first IASP.

15. The computer-readable storage medium of claim 13, the operation further comprising:

prior to bringing the third IASP and the fourth IASP online, performing a resynchronization between the third IASP and the fourth IASP.

16. The computer-readable storage medium of claim 13, wherein bringing the third IASP and the fourth IASP online further comprises preserving a same set of states between the third IASP and the fourth IASP that the first IASP and the second IASP had before being taken offline.

* * * * *